US012803024B2

(12) United States Patent
Daimon

(10) Patent No.: US 12,803,024 B2
(45) **Date of Patent: *Nov. 17, 2026**

(54) ELECTROCHEMICAL HYDROGEN COMPRESSION SYSTEM

(71) Applicant: HONDA MOTOR CO., LTD., Tokyo (JP)

(72) Inventor: Hayato Daimon, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 465 days.

This patent is subject to a terminal disclaimer.

(21) Appl. No.: 18/406,600

(22) Filed: Jan. 8, 2024

(65) Prior Publication Data

US 2024/0243314 A1 Jul. 18, 2024

(30) Foreign Application Priority Data

Jan. 13, 2023 (JP) ................................ 2023-003444

(51) Int. Cl.

*H01M 8/04746* (2016.01)
*H01M 8/0258* (2016.01)
*H01M 8/04082* (2016.01)
*H01M 8/04119* (2016.01)
*H01M 8/04858* (2016.01)

(52) U.S. Cl.

CPC ..... *H01M 8/04776* (2013.01); *H01M 8/0258* (2013.01); *H01M 8/04126* (2013.01); *H01M 8/04201* (2013.01); *H01M 8/04917* (2013.01)

(58) Field of Classification Search

CPC ........... H01M 8/04776; H01M 8/0258; H01M 8/04126; H01M 8/04201; H01M 8/04917
See application file for complete search history.

(56) References Cited

U.S. PATENT DOCUMENTS

| | | | | |
|---|---|---|---|---|
| 7,045,233 | B2 * | 5/2006 | McElroy | H01M 8/0681 429/444 |
| 11,192,064 | B2 * | 12/2021 | Zhang | B01D 53/326 |
| 12,473,906 | B2 * | 11/2025 | Daimon | F04B 45/047 |

(Continued)

FOREIGN PATENT DOCUMENTS

| | | | | |
|---|---|---|---|---|
| JP | 2019031700 A * | 2/2019 | | |
| JP | 2022-094891 A | 6/2022 | | |
| WO | WO-2016063647 A1 * | 4/2016 | | C25B 9/75 |

OTHER PUBLICATIONS

JPO Decision to grant a Patent for JP 2023003444 (Year: 2025).*
JP 2019031700 MT (Year: 2019).*

*Primary Examiner* — Alexander Usyatinsky
(74) *Attorney, Agent, or Firm* — Carrier, Shende & Associates P.C.; Fulchand P. Shende; Joseph P. Carrier

(57) ABSTRACT

An electrochemical hydrogen compression system includes a hydrogen compression stack, and a control device. The control device is equipped with an operation control unit that causes hydrogen gas to be supplied to a hydrogen compression stack, together with causing an electrical current to be supplied to the hydrogen compression stack from an electrical power source device, and causes a compression operation to be executed by the hydrogen compression stack, and an operation stop control unit which, upon receiving an operation stop command during execution of the compression operation, causes the liquid water to be supplied to the hydrogen compression stack, and thereafter causes the hydrogen gas to be supplied to the hydrogen compression stack.

10 Claims, 9 Drawing Sheets

(56) References Cited

U.S. PATENT DOCUMENTS

| | | | | |
|---|---|---|---|---|
| 2004/0058209 | A1 * | 3/2004 | Benson ................. | H01M 8/241 429/411 |
| 2018/0166714 | A1 * | 6/2018 | Kamino .............. | H01M 8/1018 |
| 2022/0185665 | A1 | 6/2022 | Daimon et al. | |

* cited by examiner

10

ELECTROCHEMICAL HYDROGEN COMPRESSION SYSTEM

CROSS-REFERENCE TO RELATED APPLICATIONS

This application is based upon and claims the benefit of priority from Japanese Patent Application No. 2023-003444 filed on Jan. 13, 2023, the contents of which are incorporated herein by reference.

BACKGROUND OF THE INVENTION

Field of the Invention

The present invention relates to an electrochemical hydrogen compression system.

Description of the Related Art

In recent years, in order to make it possible for more people to be capable of relying thereon at an affordable cost, and to ensure access to sustainable and advanced energy, research and development have been conducted in relation to an electrochemical hydrogen compression system that contributes to energy efficiency.

The electrochemical hydrogen compression system disclosed in JP 2022-094891 A includes an electrochemical hydrogen compression device that compresses hydrogen. The electrochemical hydrogen compression device is equipped with a hydrogen compression stack (hydrogen compression part), and an electrical power source device (power supply). The hydrogen compression stack is equipped with a unit cell containing an electrolyte membrane, an anode power feeder, and a cathode power feeder. The electrical power source device supplies an electrical current to the hydrogen compression stack, and thereby causes the hydrogen compression stack to generate high pressure hydrogen gas having a higher pressure than the hydrogen gas supplied to the hydrogen compression stack.

In JP 2022-094891 A, it is disclosed that, based on information regarding a humidified state of the electrolyte membrane, a discharge port of the hydrogen compression stack from which non-reacted hydrogen gas is discharged is regulated, and water vapor is retained in the unit cell to thereby place the electrolyte membrane in a humidified state.

SUMMARY OF THE INVENTION

However, when the above-described technique of JP 2022-094891 A is put to use, a problem arises in that a considerable amount of time is required until the distribution of water contained within the electrolyte membrane becomes substantially uniform.

The present invention has the object of solving the aforementioned problem.

An aspect of the present invention is characterized by an electrochemical hydrogen compression system, including a hydrogen compression stack equipped with a unit cell including an electrolyte membrane, an anode, and a cathode, a supply device configured to supply hydrogen gas and liquid water to the hydrogen compression stack, an electrical power source device configured to supply an electrical current to the hydrogen compression stack, and a control device configured to control the supply device and the electrical power source device, wherein the control device includes an operation control unit configured to cause the hydrogen gas to be supplied to the hydrogen compression stack, together with causing the electrical current to be supplied to the hydrogen compression stack from the electrical power source device, and to cause a compression operation to be executed by the hydrogen compression stack, and an operation stop control unit which, upon receiving an operation stop command during execution of the compression operation, causes the liquid water to be supplied to the hydrogen compression stack, and thereafter causes the hydrogen gas to be supplied to the hydrogen compression stack.

According to the above-described aspect, the distribution of water contained within the electrolyte membrane can be made substantially uniform in a short time period. As a result, the hydrogen compression stack can be started at an early stage.

The above and other objects, features, and advantages of the present invention will become more apparent from the following description when taken in conjunction with the accompanying drawings, in which preferred embodiments of the present invention are shown by way of illustrative example.

DETAILED DESCRIPTION OF THE INVENTION

In the following description, the term "upstream" implies upstream in a direction (flow direction) in which a fluid flows. Similarly, the term "downstream" implies downstream in a direction (flow direction) in which the fluid flows.

First Embodiment

Figure 1:
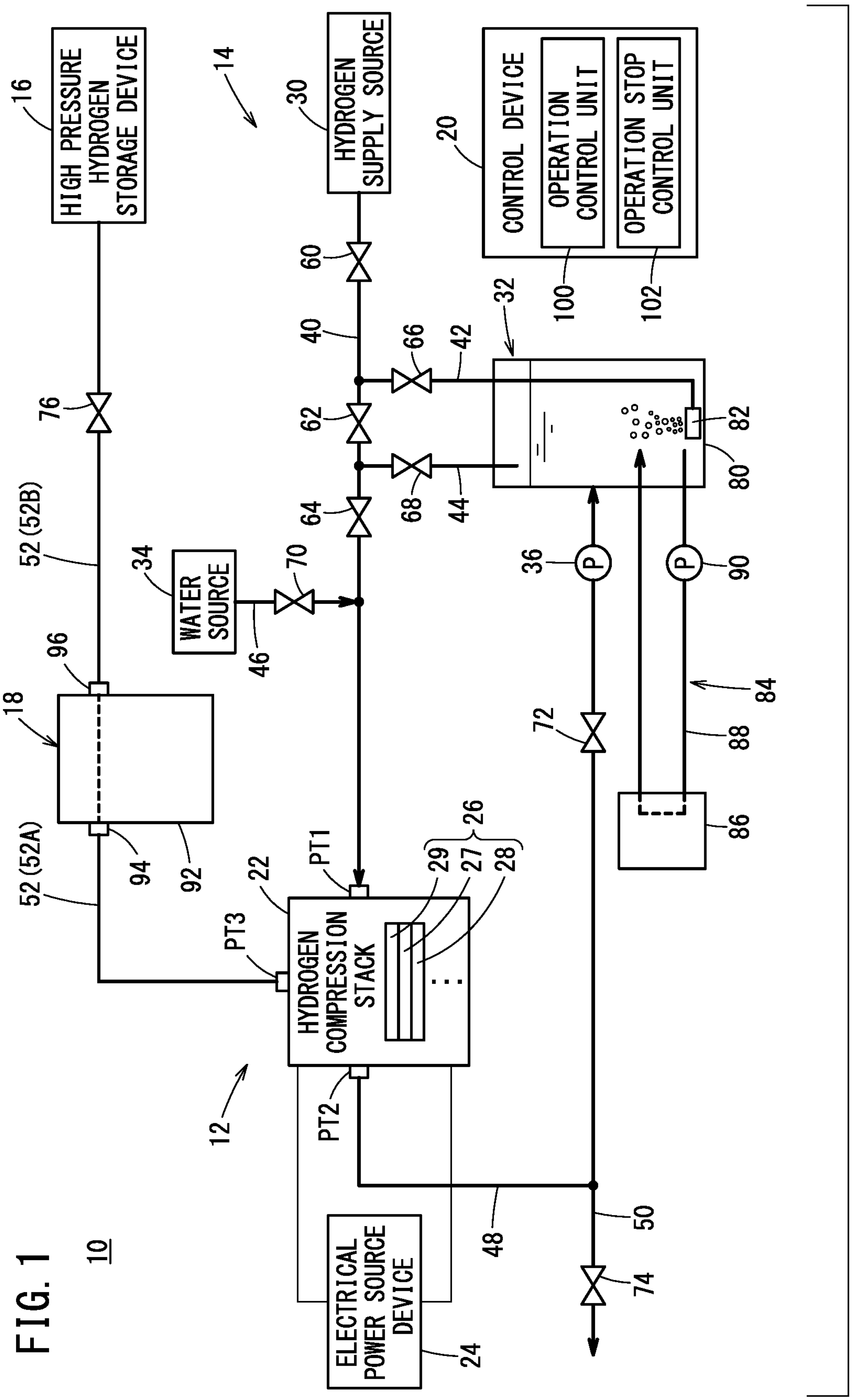
FIG. 1 is a schematic diagram showing an electrochemical hydrogen compression system according to a first embodiment.

FIG. 1 is a schematic diagram showing an electrochemical hydrogen compression system 10 according to a first embodiment. The electrochemical hydrogen compression system 10 is equipped with an electrochemical hydrogen compression device 12, a supply device 14, a high pressure hydrogen storage device 16, a gas-liquid separation device 18, and a control device 20.

The electrochemical hydrogen compression device 12 is a device that electrochemically compresses a hydrogen gas. The electrochemical hydrogen compression device 12 includes a hydrogen compression stack 22 and an electrical power source device 24.

The hydrogen compression stack 22 includes an introduction port PT1, a discharge port PT2, a high pressure hydrogen port PT3, and a plurality of unit cells 26. The introduction port PT1 is a port through which hydrogen gas is introduced. The introduction port PT1 communicates with an anode side of each of the unit cells 26. The discharge port PT2 is a port through which non-reacted hydrogen gas is discharged. The discharge port PT2 communicates with the anode side of each of the unit cells 26. The high pressure hydrogen port PT3 is a port through which high pressure hydrogen gas generated in the unit cells 26 is discharged. The high pressure hydrogen port PT3 communicates with a cathode side of each of the unit cells 26.

The plurality of the unit cells 26 are each respectively of the same configuration. Each of the unit cells 26 includes an electrolyte membrane 27, an anode 28 provided on one surface of the electrolyte membrane 27, and a cathode 29 provided on another surface of the electrolyte membrane 27.

The electrolyte membrane 27, for example, is a solid polymer electrolyte membrane (cation exchange membrane). The electrolyte membrane 27 may be reinforced on the anode side thereof with a protective sheet containing a fibrous skeletal framework. Further, for the electrolyte membrane 27, an HC (hydrocarbon) electrolyte can be used in addition to a fluorine electrolyte. The electrolyte membrane 27 is sandwiched between the anode 28 and the cathode 29.

The anode 28 includes an anode catalyst layer joined to one surface of the electrolyte membrane 27, and an anode power feeder laminated on the anode catalyst layer. The cathode 29 includes a cathode catalyst layer joined to another surface of the electrolyte membrane 27, and a cathode power feeder laminated on the cathode catalyst layer. The anode power feeder and the cathode power feeder are formed with a structure through which hydrogen gas is capable of flowing.

When an electrical current is supplied between the anode 28 and the cathode 29, a portion of the hydrogen gas supplied to the anode 28 from the introduction port PT1 is converted into protons ($H^+$ ions) by a catalytic reaction. The converted protons are transported to the cathode 29 via the electrolyte membrane 27. At the cathode 29, a high pressure hydrogen gas is generated by an electrochemical reaction in which the transported protons are used. The high pressure hydrogen gas flows out from the high pressure hydrogen port PT3. Non-reacted hydrogen gas at the anode 28 flows out from the discharge port PT2.

The electrical power source device 24 supplies an electrical current to the hydrogen compression stack 22. When such an electrical current is supplied to the hydrogen compression stack 22, the hydrogen compression stack 22 generates a high pressure hydrogen gas having a higher pressure than the hydrogen gas supplied to the hydrogen compression stack 22.

The electrical power source device 24 applies a voltage to the anode 28 and the cathode 29 of each of the unit cells 26, and thereby supplies the electrical current to the unit cells 26. Under the control of the control device 20, the electrical power source device 24 is configured to be capable of adjusting a magnitude of the electrical current supplied to each of the unit cells 26. As the electrical current supplied to the unit cells 26 becomes greater, the amount of the high pressure hydrogen gas generated in the unit cells 26 becomes more plentiful.

The supply device 14 is a device that serves to supply the hydrogen gas and liquid water to the hydrogen compression stack 22. The supply device 14 includes a hydrogen supply source 30, a humidifier 32, a water source 34, a pump 36, a plurality of flow pathways, and a plurality of valves. The plurality of flow pathways include a supply pathway 40, an inlet pathway 42, an outlet pathway 44, a water supply pathway 46, and a non-reacted gas pathway 48. The plurality of valves include a pressure reducing valve 60, a hydrogen supply valve 62, a flow rate adjustment valve 64, an inlet valve 66, an outlet valve 68, a water supply valve 70, and a discharge valve 72.

The hydrogen supply source 30 is a device that is capable of supplying hydrogen gas. The hydrogen supply source 30 may be a pallet on which a plurality of gas cylinders in which hydrogen gas is stored are gathered together. The hydrogen supply source 30 serves to supply the hydrogen gas to the hydrogen compression stack 22 via the supply pathway 40. The hydrogen gas supplied to the hydrogen compression stack 22 flows from the introduction port PT1 of the hydrogen compression stack 22 to the anode side of each of the unit cells 26.

The supply pathway 40 is a pathway that guides the hydrogen gas from the hydrogen supply source 30 to the hydrogen compression stack 22. An upstream end of the supply pathway 40 is connected to the hydrogen supply source 30. A downstream end of the supply pathway 40 is connected to the introduction port PT1 of the hydrogen compression stack 22. The supply pathway 40 is provided with the pressure reducing valve 60, the hydrogen supply valve 62, and the flow rate adjustment valve 64 in this order from an upstream side to a downstream side.

Although there is one pressure reducing valve 60 shown in FIG. 1, two or more pressure reducing valves 60 may be provided. The hydrogen supply valve 62 opens or closes under the control of the control device 20. Under the control of the control device 20, the flow rate adjustment valve 64 adjusts the flow rate of the hydrogen gas supplied to the hydrogen compression stack 22.

The humidifier 32 is a device that serves to humidify the hydrogen gas. The humidifier 32 includes a hermetically sealed container 80. The humidifier 32 vaporizes the liquid water that is stored in the sealed container 80. The humidifier 32 supplies the water vapor to the supply pathway 40 via the outlet pathway 44.

The outlet pathway 44 is a pathway that guides the water vapor from the humidifier 32 to the supply pathway 40. An upstream end of the outlet pathway 44 is arranged in an internal space of the sealed container 80. A downstream end of the outlet pathway 44 is connected to the supply pathway 40 between the hydrogen supply valve 62 and the flow rate adjustment valve 64. The outlet valve 68 is provided in the outlet pathway 44. The outlet valve 68 opens or closes under the control of the control device 20.

The humidifier 32 may be a bubbler type humidifier. In FIG. 1, an example is shown in which the humidifier 32 is a bubbler type humidifier. In this case, the humidifier 32 includes a bubble generator 82. According to the present embodiment, the bubble generator 82 is placed within the liquid water inside the sealed container 80. The bubble generator 82 releases the hydrogen gas supplied via the inlet pathway 42 from the supply pathway 40, as bubbles into the liquid water. In this case, the hydrogen gas contains water vapor. The hydrogen gas containing the water vapor is supplied to the supply pathway 40 via the outlet pathway 44.

The inlet pathway 42 is a pathway that guides a portion of the hydrogen gas flowing through the supply pathway 40 from the supply pathway 40 to the bubble generator 82. An upstream end of the inlet pathway 42 is connected to a location in the supply pathway 40 that is more upstream than the location to which the downstream end of the outlet pathway 44 is connected. A downstream end of the inlet pathway 42 is connected to the bubble generator 82. The inlet valve 66 is provided in the inlet pathway 42. The inlet valve 66 opens or closes under the control of the control device 20.

Moreover, a temperature adjustment device 84 that adjusts the temperature of the liquid water stored in the sealed container 80 may be provided. The temperature adjustment device 84 is equipped with a heat exchanger 86, a circulation pathway 88 that circulates between the heat exchanger 86 and the sealed container 80, and a pump 90 provided in the circulation pathway 88. The temperature adjustment device 84 drives the pump 90, and thereby causes the liquid water to circulate between the heat exchanger 86 and the sealed container 80 via the circulation pathway 88, and adjusts the temperature of the liquid water to a set temperature by undergoing heat exchange with the heat exchanger 86.

The water source 34 is a device that is capable of supplying the liquid water. The water source 34 may be a tank in which the liquid water is stored. The water source 34 supplies the liquid water to the supply pathway 40 via the water supply pathway 46.

The water supply pathway 46 is a pathway that guides the liquid water from the water source 34 to the supply pathway 40. An upstream end of the water supply pathway 46 is connected to the water source 34. A downstream end of the water supply pathway 46 is connected to a location in the supply pathway 40 that is more downstream than a location to which a downstream end of the outlet pathway 44 is connected.

The pump 36 is a device that supplies non-reacted hydrogen gas that is discharged from the hydrogen compression stack 22 to the sealed container 80. The pump 36 is disposed in the non-reacted gas pathway 48. The pump 36 is driven under the control of the control device 20. When the pump 36 is driven, a flowing force is applied to the hydrogen gas from the upstream side to the downstream side.

The non-reacted gas pathway 48 is a pathway that guides non-reacted hydrogen gas discharged from the hydrogen compression stack 22 from the hydrogen compression stack 22 to the sealed container 80. An upstream end of the non-reacted gas pathway 48 is connected to the discharge port PT2 of the hydrogen compression stack 22. A downstream end of the non-reacted gas pathway 48 is connected to the sealed container 80. The discharge valve 72 is disposed in the non-reacted gas pathway 48. The discharge valve 72 opens or closes under the control of the control device 20.

A vent pathway 50 is connected to the non-reacted gas pathway 48 on a more upstream side than the discharge valve 72. The vent pathway 50 is a pathway that guides the hydrogen gas flowing through the non-reacted gas pathway 48 to an atmospheric space. A vent valve 74 is provided in the vent pathway 50. The vent valve 74 opens or closes under the control of the control device 20. The hydrogen gas that flows out into the non-reacted gas pathway 48 is supplied into the sealed container 80, or alternatively, is exhausted through the vent pathway 50.

The high pressure hydrogen storage device 16 is a device that is formed to be capable of storing the high pressure hydrogen gas. The high pressure hydrogen storage device 16 may be a pallet on which a plurality of gas cylinders in which the high pressure hydrogen gas is stored are gathered together. The high pressure hydrogen storage device 16 stores the high pressure hydrogen gas supplied from the hydrogen compression stack 22 via a discharge pathway 52.

The discharge pathway 52 is a pathway that guides the high pressure hydrogen gas discharged from the hydrogen compression stack 22. An upstream end of the discharge pathway 52 is connected to the high pressure hydrogen port PT3 of the hydrogen compression stack 22. A downstream end of the discharge pathway 52 is connected to the high pressure hydrogen storage device 16. A pressure control valve 76 is disposed in the discharge pathway 52. The pressure control valve 76 is a valve that allows fluid to flow to the downstream side when the pressure on the upstream side becomes a set pressure. The set pressure is set by the control device 20. As examples of the pressure control valve 76, there may be cited a solenoid valve, a back pressure valve, or the like.

The gas-liquid separation device 18 is a device that separates respective fluids from a multiphase flow of gas and liquid water. The gas-liquid separation device 18 is disposed in the discharge pathway 52 between the pressure control valve 76 and the hydrogen compression stack 22. The gas-liquid separation device 18 includes a water tank unit 92. A gas input member 94 and a gas outlet member 96 are formed in the water tank unit 92. The gas input member 94 is connected to a downstream end of an upstream portion 52A of the discharge pathway 52. The gas outlet member 96 is connected to an upstream end of a downstream portion 52B of the discharge pathway 52.

The gas-liquid separation device 18 takes in the high pressure hydrogen gas discharged from the hydrogen compression stack 22 via the gas input member 94. The gas-liquid separation device 18 separates water (liquid water) within the high pressure hydrogen gas that is discharged from the hydrogen compression stack 22. The gas-liquid separation device 18, for example, cools the high pressure hydrogen gas, and thereby separates the water from the high pressure hydrogen gas. The gas-liquid separation device 18 stores the water separated from the high pressure hydrogen gas in the water tank unit 92. Dry high pressure hydrogen gas, which is high pressure hydrogen gas from which the water has been separated, is supplied to the high pressure hydrogen storage device 16 from the gas outlet member 96 via the downstream portion 52B of the discharge pathway 52.

The control device 20 is a device that controls the electrochemical hydrogen compression device 12 and the supply device 14. The control device 20 includes one or more processors and a storage medium. As the storage medium, there may be cited a volatile memory and a nonvolatile memory. As the processor, there may be cited a CPU, an MCU, or the like. As the volatile memory, for example, there may be cited a RAM or the like. As the nonvolatile memory, for example, there may be cited a ROM, a flash memory, or the like.

The control device 20 includes an operation control unit 100 and an operation stop control unit 102. The operation control unit 100 and the operation stop control unit 102 are realized by the processor executing programs stored in the storage medium. At least one of the operation control unit 100 or the operation stop control unit 102 may be realized by an integrated circuit such as an ASIC, an FPGA, or the like. Alternatively, at least one of the operation control unit 100 or the operation stop control unit 102 may be realized by an electronic circuit including a discrete device.

Upon receiving an operation command, the operation control unit 100 causes the hydrogen compression stack 22 to perform a compression operation. More specifically, the operation control unit 100 opens the hydrogen supply valve 62, and thereby supplies the hydrogen gas from the hydrogen supply source 30 to the hydrogen compression stack 22. Further, the operation control unit 100 controls the electrical power supply device 24, and thereby supplies an electrical current from the electrical power supply device 24 to the hydrogen compression stack 22. In this case, in the hydrogen compression stack 22, a compression operation is executed. In the case that the compression operation is executed, an electrochemical reaction is performed in each of the unit cells 26 based on the hydrogen gas supplied from the hydrogen supply source 30. Consequently, the high pressure hydrogen gas is generated on the cathode side of each of the unit cells 26.

During execution of the compression operation, the operation control unit 100 drives the pump 36, opens the discharge valve 72, and thereby causes the non-reacted hydrogen gas to be supplied to the sealed container 80 from the hydrogen compression stack 22. Further, the operation control unit 100 opens the vent valve 74 at an arbitrary timing to cause the hydrogen gas to be exhausted.

During execution of the compression operation, based on a target generation amount of the high pressure hydrogen gas, the operation control unit 100 controls the degree to which the flow rate adjustment valve 64 is opened, and thereby adjusts the flow rate of the hydrogen gas supplied to the hydrogen compression stack 22.

During execution of the compression operation, the operation control unit 100 opens the inlet valve 66 and the outlet valve 68, and thereby causes the water vapor to be introduced together with the hydrogen gas into the supply pathway 40. Consequently, the operation control unit 100 humidifies the hydrogen gas that is supplied to the hydrogen compression stack 22. The operation control unit 100 may control at least one of the degree to which the hydrogen supply valve 62 is opened or the degree to which the inlet valve 66 is opened, and may thereby adjust the flow rate ratio between the hydrogen gas that passes through the humidifier 32, and the hydrogen gas that does not pass through the humidifier 32. It should be noted that, during execution of the compression operation, the water supply valve 70 is closed.

When the operation stop control unit 102 receives the operation stop command during execution of the compression operation, the operation stop control unit 102 controls the electrical power supply device 24, and thereby causes the supply of the electrical current to the hydrogen compression stack 22 to stop. Further, the operation stop control unit 102 closes the hydrogen supply valve 62, the inlet valve 66, and the outlet valve 68, and thereby causes the supply of the hydrogen gas to the hydrogen compression stack 22 to stop. Furthermore, the operation stop control unit 102 stops driving the pump 36, and closes the discharge valve 72, and thereby causes the discharging of the fluid from the discharge port PT2 (the anode side of each of the unit cells 26) of the hydrogen compression stack 22 to stop.

Moreover, it should be noted that the operation stop control unit 102 need not necessarily close the hydrogen supply valve 62. In this case, the supply of the hydrogen gas to the hydrogen compression stack 22 is not stopped. However, since the inlet valve 66 and the outlet valve 68 are closed, the hydrogen gas supplied to the hydrogen compression stack 22 is not humidified.

Figure 2:
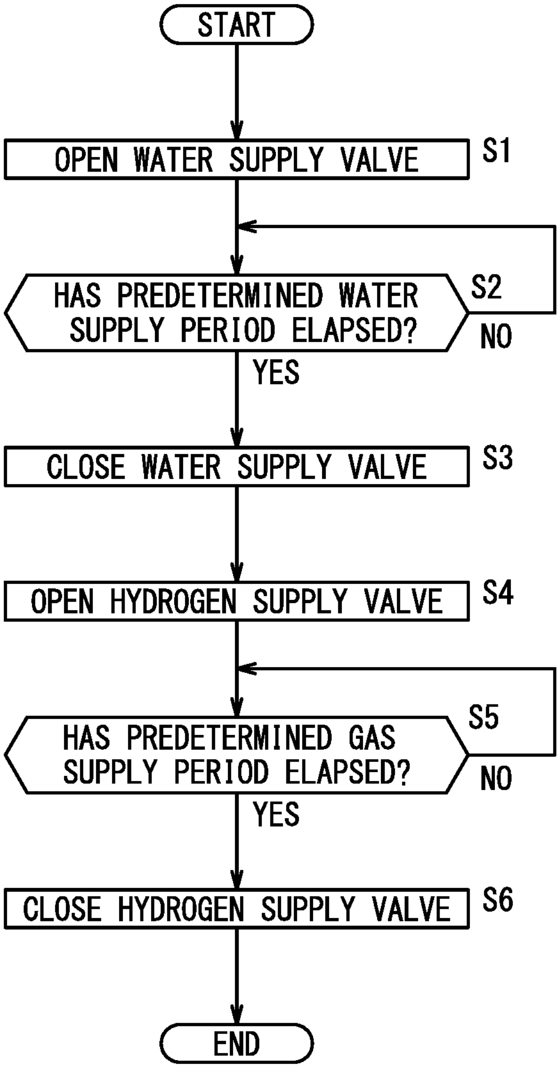
FIG. 2 is a flowchart showing a procedure of a water content adjustment process according to the first embodiment.

When the supply of the electrical current to the hydrogen compression stack 22 is stopped, and the discharge of the fluid from the discharge port PT2 (the anode side of each of the unit cells 26) of the hydrogen compression stack 22 is stopped, the operation stop control unit 102 executes the water content adjustment process. The water content adjustment process is a process to adjust the water content of each of the unit cells 26. FIG. 2 is a flowchart showing the procedure of the water content adjustment process according to the first embodiment.

In step S1, after having opened the water supply valve 70, the operation stop control unit 102 transitions to step S2.

When the water supply valve 70 is opened, liquid water is supplied from the water source 34 to the supply pathway 40. The liquid water supplied to the supply pathway 40 flows from the introduction port PT1 of the hydrogen compression stack 22 to the anode side of each of the unit cells 26. Prior to the water content adjustment process, discharging of the fluid from the discharge port PT2 (the anode side of each of the unit cells 26) of the hydrogen compression stack 22 is stopped. Therefore, the liquid water that has flowed to the anode side of each of the unit cells 26 stagnates. Accordingly, the electrolyte membrane 27 of each of the unit cells 26 is immersed in the liquid water.

In step S2, the operation stop control unit 102 determines whether a predetermined water supply period has elapsed from the supplying of liquid water having started (the water supply valve 70 being opened). Based on the cross-sectional area or the like of the pipeline, the water supply period is set as a period during which a predetermined amount of the liquid water is supplied. In the case that the predetermined water supply period has not elapsed, the operation stop control unit 102 determines that the supplied amount of the liquid water has not yet reached the predetermined amount. In this case, the operation stop control unit 102 remains at step S2. When the predetermined water supply period has elapsed, the operation stop control unit 102 determines that the supplied amount of the liquid water has reached the predetermined amount. In this case, the operation stop control unit 102 transitions to step S3.

In step S3, the operation stop control unit 102 closes the water supply valve 70, and thereafter, the process transitions to step S4. When the water supply valve 70 is closed, the supply of the liquid water to the hydrogen compression stack 22 is stopped.

In step S4, after having opened the hydrogen supply valve 62, the operation stop control unit 102 transitions to step S5. Moreover, prior to starting the water content adjustment process, in the case that the hydrogen supply valve 62 is not closed, the operation stop control unit 102 transitions to step S5 while maintaining the hydrogen supply valve 62 open. In this case, by supplying the hydrogen gas, the liquid water contained in the electrolyte membrane 27 can be blown out and removed.

When the hydrogen supply valve 62 is opened, the hydrogen gas is supplied to the hydrogen compression stack 22 via the supply pathway 40 without being humidified by the humidifier 32. The hydrogen gas supplied to the hydrogen compression stack 22 flows from the introduction port PT1 to the anode side of each of the unit cells 26. Prior to the water content adjustment process, the supply of the electrical current to the hydrogen compression stack 22 is stopped. Therefore, high pressure hydrogen gas is not generated on the cathode side of each of the unit cells 26, and the gas pressure in the discharge pathway 52 including the cathode side of each of the unit cells 26 starts to be reduced. Accordingly, the hydrogen gas that has flowed to the anode side of each of the unit cells 26 passes through the electrolyte membrane 27 of each of the unit cells 26, and flows to the cathode side of each of the unit cells 26. At this time, a portion of the water remaining in the electrolyte membrane 27 of each of the unit cells 26 that are immersed in the liquid water is pushed out to the cathode side of each of the unit cells 26 by the hydrogen gas. The water that is pushed out to the cathode side of each of the unit cells 26 is discharged together with the hydrogen gas from the high pressure hydrogen port PT3, and is stored in the water tank unit 92 of the gas-liquid separation device 18. On the other hand, since the gas pressure in the discharge pathway 52 is reduced, the hydrogen gas discharged from the high pressure hydrogen port PT3 does not flow downstream from the pressure control valve 76.

In step S5, the operation stop control unit 102 determines whether a predetermined gas supply period has elapsed since the supply of liquid water was stopped. Based on a cross-sectional area or the like of the pipeline, the gas supply period is set as a period during which a predetermined amount of the hydrogen gas is supplied. In the case that the predetermined gas supply period has not elapsed, the operation stop control unit 102 determines that the supplied amount of the hydrogen gas has not yet reached the predetermined amount. In this case, the operation stop control unit 102 remains at step S5. When the predetermined gas supply period has elapsed, the operation stop control unit 102 determines that the supplied amount of the hydrogen gas has reached the predetermined amount. In this case, the operation stop control unit 102 transitions to step S6.

In step S6, the operation stop control unit 102 closes the hydrogen supply valve 62, and thereafter, the water content adjustment process comes to an end.

In the foregoing manner, according to the present embodiment, when the operation stop control unit 102 receives the operation stop command during the compression operation, the operation stop control unit 102 causes the liquid water to be supplied to the hydrogen compression stack 22, and thereafter, causes the hydrogen gas to be supplied to the hydrogen compression stack 22.

Accordingly, after the electrolyte membrane 27 of each of the unit cells 26 in the hydrogen compression stack 22 has been uniformly impregnated with water, the water content of the electrolyte membrane 27 can be appropriately adjusted by being supplied with the hydrogen gas. In accordance therewith, the distribution of the water contained within the electrolyte membrane 27 can be made substantially uniform in a short time period. As a result, the hydrogen compression stack 22 can be started at an early stage.

Second Embodiment

Figure 3:
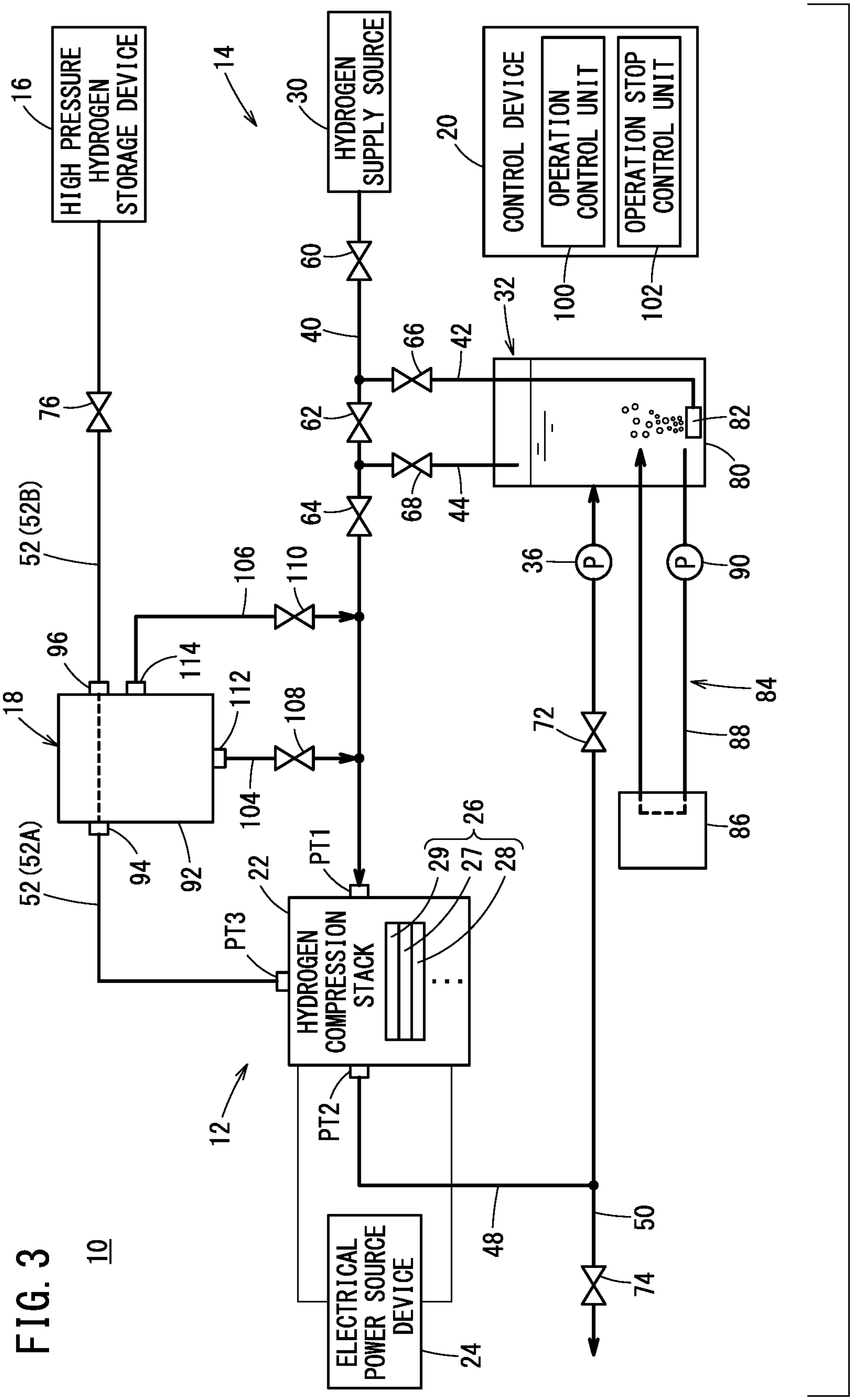
FIG. 3 is a schematic diagram showing an electrochemical hydrogen compression system according to a second embodiment.

FIG. 3 is a schematic diagram showing an electrochemical hydrogen compression system 10 according to a second embodiment. In FIG. 3, the same constituent elements as those described in the first embodiment are designated by the same reference numerals. Moreover, it should be noted that in the present embodiment, explanations that overlap or are redundant with those in the first embodiment will be omitted.

According to the present embodiment, the water source 34, the water supply pathway 46, and the water supply valve 70 are not provided. On the other hand, in the present embodiment, a water return pathway 104, a hydrogen return pathway 106, a water return valve 108, and a hydrogen return valve 110 are newly provided. The water return pathway 104, the hydrogen return pathway 106, the water return valve 108, and the hydrogen return valve 110 are contained within the supply device 14. Further, in the present embodiment, the gas-liquid separation device 18 is contained within the supply device 14, and the water tank unit 92 of the gas-liquid separation device 18 is used as the water source 34.

The water return pathway 104 is a pathway that guides the liquid water from the gas-liquid separation device 18 to the supply pathway 40. An upstream end of the water return pathway 104 is connected to a water outlet member 112 formed in the water tank unit 92. A downstream end of the water return pathway 104 is connected to a location in the supply pathway 40 that is more downstream than a location to which a downstream end of the outlet pathway 44 is connected.

The hydrogen return pathway 106 is a pathway that guides the high pressure hydrogen gas from the gas-liquid separation device 18 to the supply pathway 40. An upstream end of the hydrogen return pathway 106 is connected to a hydrogen outlet member 114 formed in the water tank unit 92. A downstream end of the hydrogen return pathway 106 is connected to a location in the supply pathway 40 that is more downstream than a location to which a downstream end of the outlet pathway 44 is connected.

The water return valve 108 is disposed in the water return pathway 104. The water return valve 108 opens or closes under the control of the control device 20. The hydrogen return valve 110 is disposed in the hydrogen return pathway 106. The hydrogen return valve 110 opens or closes under the control of the control device 20.

The water outlet member 112 serves as a port through which the liquid water is made to flow out from the water tank unit 92. The water outlet member 112 may be formed on a bottom wall of the water tank unit 92, or may be formed on a side wall of the water tank unit 92. The hydrogen outlet member 114 serves as a port through which the high pressure hydrogen gas is made to flow out from the water tank unit 92. The hydrogen outlet member 114 may be formed on an upper wall of the water tank unit 92, or may be formed on a side wall of the water tank unit 92. In FIG. 3, an example is shown in which the water outlet member 112 is formed on a bottom wall of the water tank unit 92, and the hydrogen outlet member 114 is formed on a side wall of the water tank unit 92. In the case that the water outlet member 112 is formed on a side wall of the water tank unit 92, the water outlet member 112 is formed more downward than the gas outlet member 96 and the hydrogen outlet member 114.

Figure 4:
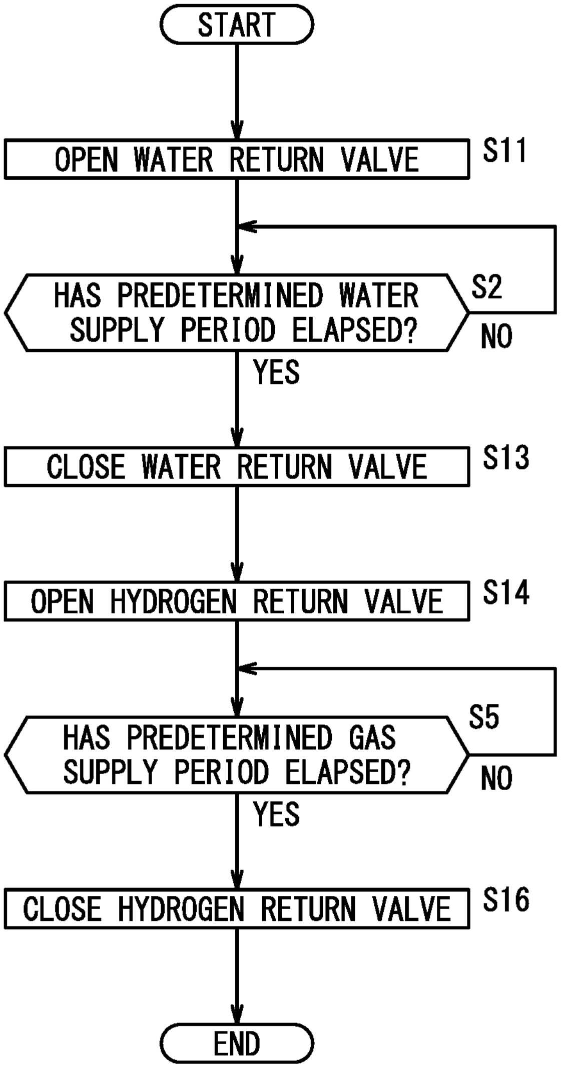
FIG. 4 is a flowchart showing a procedure of a water content adjustment process according to the second embodiment.

FIG. 4 is a flowchart showing the procedure of the water content adjustment process according to the second embodiment. In FIG. 4, the same steps as those described in the first embodiment are designated by the same reference numerals. Moreover, it should be noted that in the present embodiment, explanations that overlap or are redundant with those in the first embodiment will be omitted.

According to the present embodiment, the operation stop control unit 102, prior to starting the water content adjustment process, closes the hydrogen supply valve 62. In accordance therewith, the amount of the hydrogen gas consumed in the hydrogen supply source 30 can be reduced in comparison with a case in which the hydrogen supply valve 62 is not closed prior to starting of the water content adjustment process.

In step S11, after having opened the water return valve 108, the operation stop control unit 102 transitions to step S2.

When the water return valve 108 opens, the liquid water stored in the water tank unit 92 of the gas-liquid separation device 18 is pushed out by the high pressure hydrogen gas, and flows into the supply pathway 40 via the water return pathway 104. As noted previously, the liquid water that has flowed into the supply pathway 40 flows to the anode side of each of the unit cells 26 of the hydrogen compression stack 22, and stagnates. Accordingly, the electrolyte membrane 27 of each of the unit cells 26 is immersed in the liquid water.

In step S13, the operation stop control unit 102 closes the water return valve 108, and thereafter, the process transitions to step S14. When the water return valve 108 is closed, the supply of the liquid water to the hydrogen compression stack 22 is stopped.

In step S14, after having opened the hydrogen return valve 110, the operation stop control unit 102 transitions to step S5.

When the hydrogen return valve 110 opens, the discharge pathway 52 which is at a high pressure, and the supply pathway 40 which is at a lower pressure than the discharge pathway 52 are placed in communication with each other. Therefore, the gas pressure in the discharge pathway 52 including the cathode side of each of the unit cells 26 begins to be reduced. The speed of such a reduction in pressure is faster in comparison with the case of the first embodiment.

When the discharge pathway 52 and the supply pathway 40 are placed in communication with each other, due to the pressure difference of the gas pressures between the discharge pathway 52 and the supply pathway 40, the hydrogen gas (the high pressure hydrogen gas) in the water tank unit 92 is supplied from the gas-liquid separation device 18 to the supply pathway 40 via the hydrogen return pathway 106. As noted previously, the hydrogen gas supplied to the supply pathway 40 flows from the anode side to the cathode side of each of the unit cells 26 of the hydrogen compression stack 22 via the electrolyte membrane 27. As noted previously, the water, which is pushed out from the electrolyte membrane 27 to the cathode side of the unit cells 26, is stored in the water tank unit 92 of the gas-liquid separation device 18. On the other hand, as noted previously, the hydrogen gas that flows to the cathode side of each of the unit cells 26 does not flow downstream from the pressure control valve 76, and remains in the discharge pathway 52.

In step S16, the operation stop control unit 102 closes the hydrogen return valve 110, and thereafter, the water content adjustment process comes to an end.

In the foregoing manner, according to the present embodiment, in the same manner as in the first embodiment, when the operation stop control unit 102 receives the operation stop command during the compression operation, the operation stop control unit 102 causes the liquid water to be supplied to the hydrogen compression stack 22, and thereafter, causes the hydrogen gas to be supplied to the hydrogen compression stack 22. Accordingly, after the electrolyte membrane 27 of each of the unit cells 26 in the hydrogen compression stack 22 has been uniformly impregnated with water, the water content of the electrolyte membrane 27 can be appropriately adjusted by being supplied with the hydrogen gas. In accordance therewith, the distribution of the water contained within the electrolyte membrane 27 can be made substantially uniform in a short time period.

Further, in the present embodiment, the liquid water supplied to the hydrogen compression stack 22 is the liquid water that is stored in the water tank unit 92 of the gas-liquid separation device 18. Stated otherwise, the liquid water is water that is separated from the high pressure hydrogen gas obtained during the compression operation. Accordingly, the electrochemical hydrogen compression system 10 need not necessarily be provided with the water source 34. As a result, while suppressing an increase in the number of parts in the electrochemical hydrogen compression system 10, the distribution of the water contained in the electrolyte membrane 27 can be made substantially uniform in a short time period. In addition thereto, the liquid water can be used efficiently.

Furthermore, since hydrogen gas in a dry state from which water has been separated by the gas-liquid separation device 18 is supplied to the hydrogen compression stack 22, the water content of the electrolyte membrane 27 can be rapidly adjusted, while in addition, the hydrogen gas can be used efficiently.

Furthermore, the liquid water is pushed out from the gas-liquid separation device 18 by the high pressure hydrogen gas, and is supplied to the hydrogen compression stack 22. On the other hand, due to the pressure difference in the gas pressure between the discharge pathway 52 and the supply pathway 40, the hydrogen gas is supplied from the gas-liquid separation device 18 to the hydrogen compression stack 22. Therefore, there is no particular need to install a pump. Accordingly, while suppressing an increase in the number of parts in the electrochemical hydrogen compression system 10, the distribution of the water contained in the electrolyte membrane 27 can be made substantially uniform in a short time period.

Third Embodiment

Figure 5:
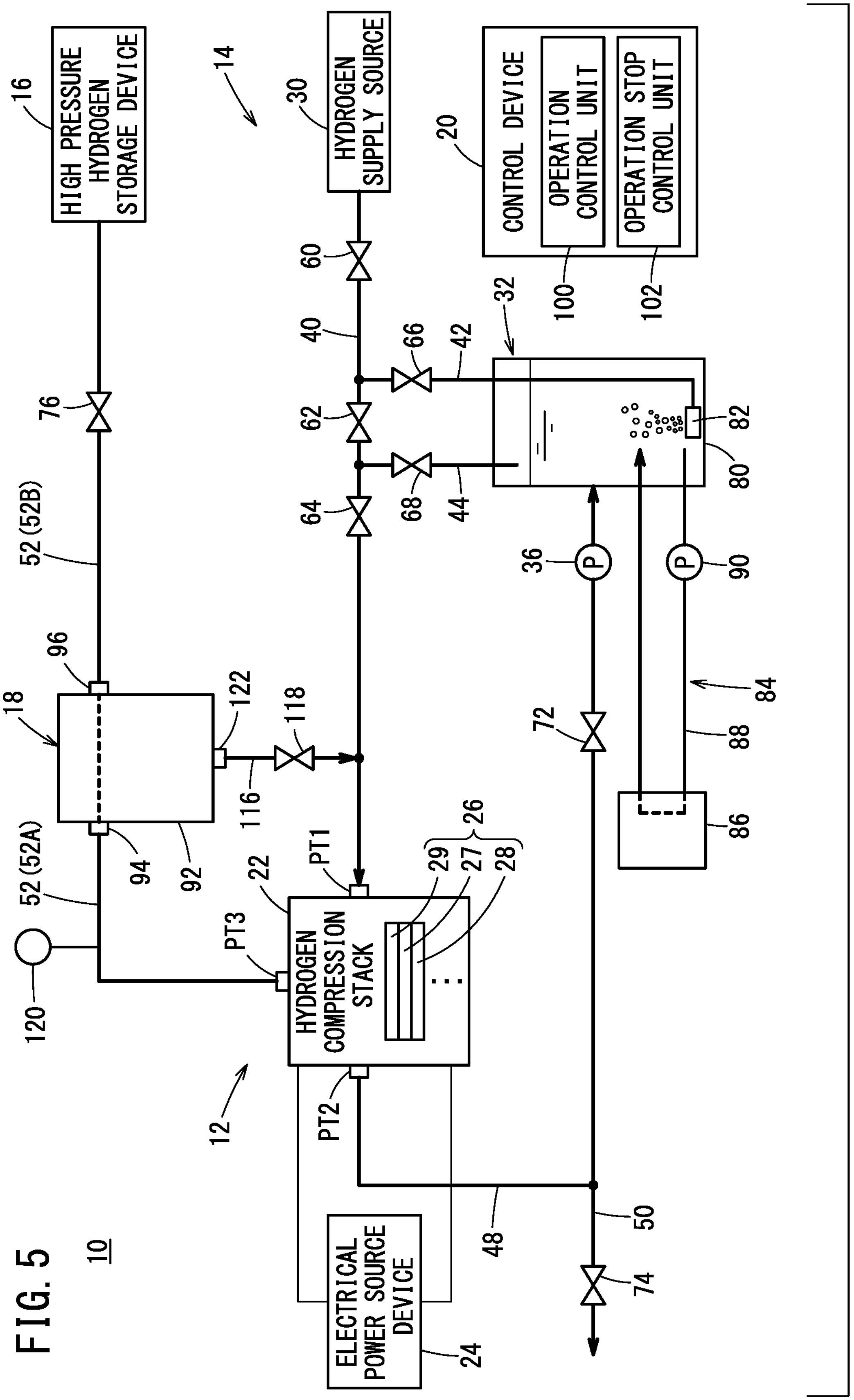
FIG. 5 is a schematic diagram showing an electrochemical hydrogen compression system according to a third embodiment.

FIG. 5 is a schematic diagram showing an electrochemical hydrogen compression system 10 according to a third embodiment. In FIG. 5, the same constituent elements as those described in the first embodiment are designated by the same reference numerals. Moreover, it should be noted that in the present embodiment, explanations that overlap or are redundant with those in the first embodiment will be omitted.

According to the present embodiment, the water source 34, the water supply pathway 46, and the water supply valve 70 are not provided. On the other hand, in the present embodiment, a return pathway 116, a return valve 118, and a pressure detector 120 are newly provided. The return pathway 116 and the return valve 118 are included in the supply device 14. Further, in the present embodiment, the gas-liquid separation device 18 is contained within the supply device 14, and the water tank unit 92 of the gas-liquid separation device 18 is used as the water source 34.

The return pathway 116 is a pathway that guides the liquid water and the high pressure hydrogen gas (dry high pressure hydrogen gas) from the gas-liquid separation device 18 to the supply pathway 40. An upstream end of the return pathway 116 is connected to a gas-liquid outlet member 122 formed in the water tank unit 92. A downstream end of the return pathway 116 is connected to a location in the supply pathway 40 that is more downstream than a location to which a downstream end of the outlet pathway 44 is connected. The return valve 118 is disposed in the return pathway 116. The return valve 118 opens or closes under the control of the control device 20. The pressure detector 120 is a device that detects the gas pressure in the discharge pathway 52. The pressure detector 120 outputs a detection result to the control device 20.

According to the present embodiment, the operation stop control unit 102, prior to starting the water content adjustment process, closes the hydrogen supply valve 62. In accordance therewith, the amount of the hydrogen gas consumed in the hydrogen supply source 30 can be reduced in comparison with a case in which the hydrogen supply valve 62 is not closed prior to starting of the water content adjustment process.

Further, in the present embodiment, as the water content adjustment process, the operation stop control unit 102 merely opens and closes the return valve 118. More specifically, when the water content adjustment process is started, the operation stop control unit 102 opens the return valve 118.

When the return valve 118 opens, the liquid water stored in the water tank unit 92 of the gas-liquid separation device 18 is pushed out by the high pressure hydrogen gas, and flows into the supply pathway 40 via the return pathway 116. As noted previously, the liquid water that has flowed into the supply pathway 40 flows to the anode side of each of the unit cells 26 of the hydrogen compression stack 22, and stagnates. Accordingly, the electrolyte membrane 27 of each of the unit cells 26 is immersed in the liquid water.

When the liquid water stored in the water tank unit 92 runs out, the discharge pathway 52 which is at a high pressure, and the supply pathway 40 which is at a lower pressure than the discharge pathway 52 are placed in communication with each other. Therefore, the gas pressure in the discharge pathway 52 including the cathode side of each of the unit cells 26 begins to be reduced. The speed of such a reduction in pressure is faster in comparison with the case of the first embodiment.

When the discharge pathway 52 and the supply pathway 40 are placed in communication with each other, due to the pressure difference of the gas pressures between the discharge pathway 52 and the supply pathway 40, the hydrogen gas (the high pressure hydrogen gas) in the water tank unit 92 is supplied from the gas-liquid separation device 18 to the supply pathway 40 via the return pathway 116. As noted previously, the hydrogen gas supplied to the supply pathway 40 flows from the anode side to the cathode side of each of the unit cells 26 of the hydrogen compression stack 22 via the electrolyte membrane 27. As noted previously, the water, which is pushed out from the electrolyte membrane 27 to the cathode side of the unit cells 26, is stored in the water tank unit 92 of the gas-liquid separation device 18. On the other hand, as noted previously, the hydrogen gas that flows to the cathode side of each of the unit cells 26 does not flow downstream from the pressure control valve 76.

At a predetermined period from having opened the return valve 118, the operation stop control unit 102 compares the gas pressure detected by the pressure detector 120 with a predetermined pressure threshold value. When the gas pressure becomes less than the pressure threshold value, the operation stop control unit 102 closes the return valve 118. In accordance therewith, an appropriate amount of the hydrogen gas can be supplied to the hydrogen compression stack 22. When the operation stop control unit 102 closes the return valve 118, the water content adjustment process comes to an end.

In the foregoing manner, according to the present embodiment, in the same manner as in the first embodiment, when the operation stop control unit 102 receives the operation stop command during the compression operation, the operation stop control unit 102 causes the liquid water to be supplied to the hydrogen compression stack 22, and thereafter, causes the hydrogen gas to be supplied to the hydrogen compression stack 22. Accordingly, in the present embodiment, the same advantageous effects as those of the first embodiment can be obtained.

Further, in the present embodiment, in the same manner as in the second embodiment, the liquid water supplied to the hydrogen compression stack 22 is the liquid water that is stored in the water tank unit 92 of the gas-liquid separation device 18. Further, in the same manner as in the second embodiment, the hydrogen gas supplied to the hydrogen compression stack 22 is the dry hydrogen gas from which water has been separated by the gas-liquid separation device 18. Furthermore, in the same manner as in the second embodiment, the liquid water is pushed out from the gas-liquid separation device 18 by the high pressure hydrogen gas, and is supplied to the hydrogen compression stack 22. On the other hand, due to the pressure difference in the gas pressure between the discharge pathway 52 and the supply pathway 40, the hydrogen gas is supplied from the gas-liquid separation device 18 to the hydrogen compression stack 22. Accordingly, in the present embodiment, the same advantageous effects as those of the second embodiment can be obtained.

Furthermore, in the present embodiment, as the water content adjustment process, the operation stop control unit 102 merely opens and closes the return valve 118. Accordingly, the processing load on the control device 20 can be reduced.

The above-described embodiments can be modified in the following manner.

(Exemplary Modification 1)

Figure 6:
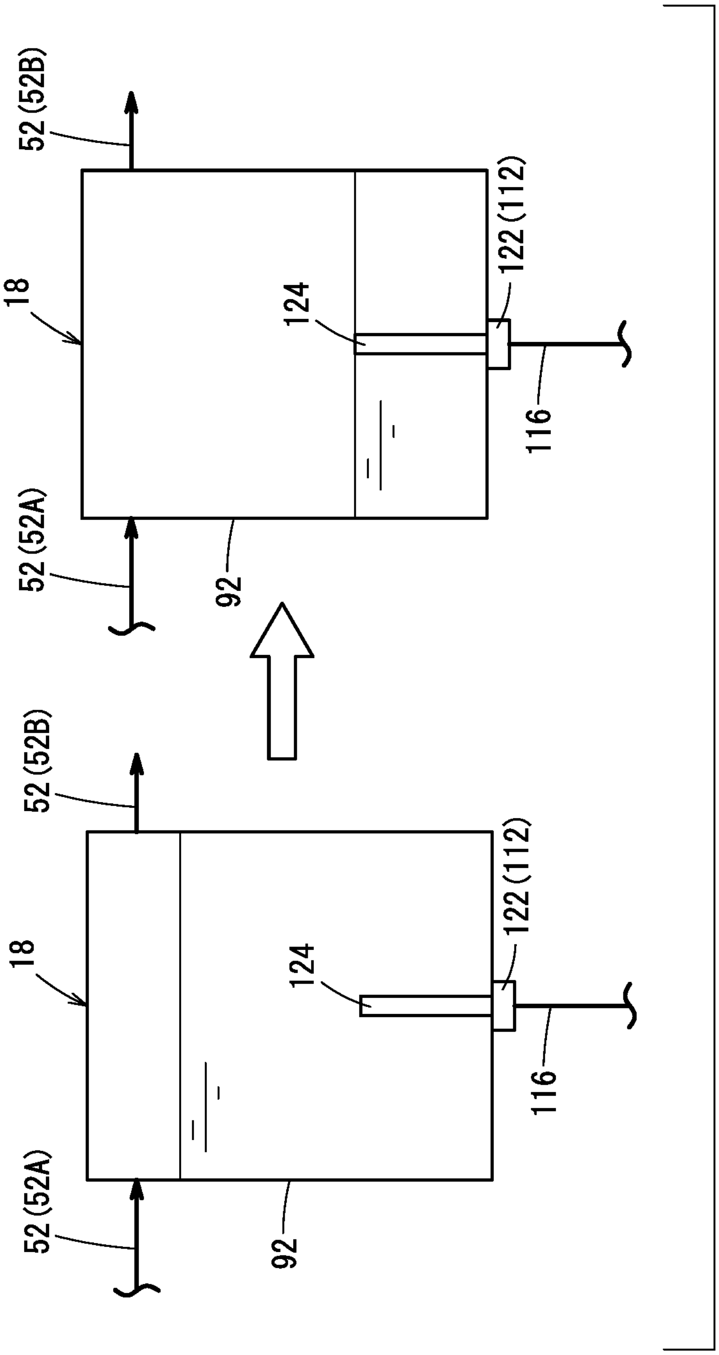
FIG. 6 is a schematic diagram showing a gas-liquid separation device.

FIG. 6 is a schematic diagram showing the gas-liquid separation device 18. In the second embodiment or the third embodiment, the gas-liquid separation device 18 may include a pipe member 124. The pipe member 124 projects out from the bottom wall of the water tank unit 92 into an internal space of the water tank unit 92. A distal end of the pipe member 124 communicates with the internal space of the water tank unit 92. A proximal end of the pipe member 124 communicates with the return pathway 116.

By being equipped with the pipe member 124, it is possible to set the gas pressure of the water tank unit 92 at a point in time when the liquid water has finished flowing out. Stated otherwise, the gas pressure in the water tank unit 92 at the point in time when the liquid water has finished flowing out is capable of being adjusted by the length of the pipe member 124. Therefore, it is possible to avoid a difference in the gas pressure between the discharge pathway 52 and the supply pathway 40 from disappearing at a timing when the liquid water has finished flowing out. Accordingly, due to the difference in the gas pressure, the hydrogen gas can be reliably supplied from the gas-liquid separation device 18 to the supply pathway 40.

(Exemplary Modification 2)

Figure 7A:
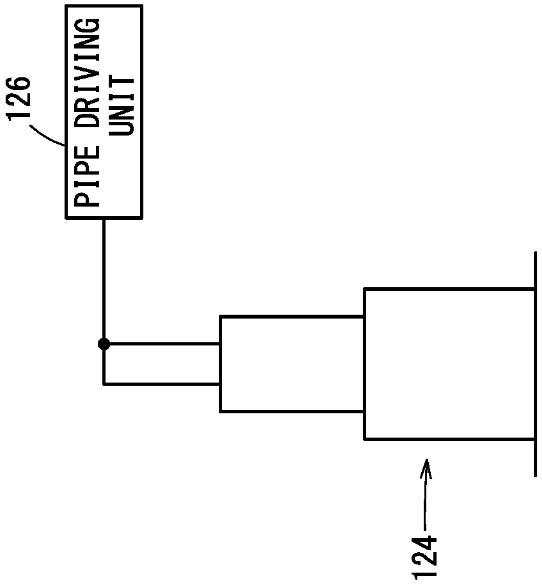
FIG. 7A is a view showing a pipe member in an extended state.
Figure 7B:
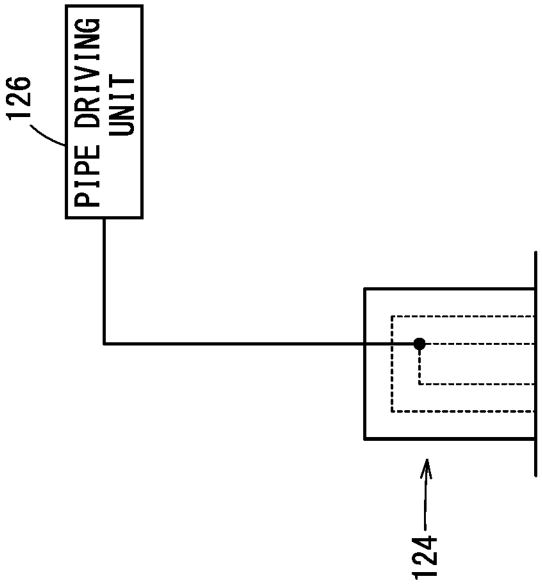
FIG. 7B is a view showing the pipe member in a contracted state.

FIG. 7A is a view showing the pipe member 124 in an extended state, and FIG. 7B is a view showing the pipe member 124 in a contracted state. In the third embodiment, the gas-liquid separation device 18 may include the pipe member 124 and a pipe driving unit 126.

In the present exemplary modification, the pipe member 124 is formed with a telescopic structure. Such a telescopic structure is a structure in which two or more overlapping cylinders are capable of expanding and contracting. A seal member is provided between the two or more cylinders that prevents the liquid water from entering therein. The pipe driving unit 126 drives the pipe member 124. For example, the pipe driving unit 126 causes the pipe member 124 to contract by pushing in a distal end of the pipe member 124 in accordance with a forward rotation of the motor. Further, the pipe driving unit 126 causes the pipe member 124 to expand by pulling the distal end portion of the pipe member 124 in accordance with a reverse rotation of the motor.

In the present exemplary modification, the operation stop control unit 102 controls the pipe driving unit 126, and thereby adjusts the length of the pipe member 124. In accordance therewith, the gas pressure in the water tank unit 92 at the point in time when the liquid water has finished flowing out can be appropriately set in accordance with the water level in the water tank unit 92.

For example, the operation stop control unit 102 adjusts the length of the pipe member 124 in accordance with the water level in the water tank unit 92 which is detected by a water level detector provided in the water tank unit 92. In this case, for example, as the water level of the water tank unit 92 becomes higher, the operation stop control unit 102 increases the length of the pipe member 124.

(Exemplary Modification 3)

In the second embodiment or the third embodiment, the operation stop control unit 102 may calculate an amount of water discharged from the gas-liquid separation device 18 based on a water level of the liquid water stored in the gas-liquid separation device 18, and may change the timing at which the water return valve 108 or the return valve 118 is closed depending on the amount of water. In accordance with such features, the gas supply period during which the gas is supplied can be automatically set in accordance with the supplied amount of the liquid water.

(Exemplary Modification 4)

In the second embodiment or the third embodiment, in the case that the water level of the water tank unit 92 at a time when the water content adjustment process is started exceeds a predetermined upper limit value, the operation stop control unit 102 may open the hydrogen supply valve 62. In accordance with this feature, the hydrogen gas supplied to the hydrogen compression stack 22 can be replenished. As a result thereof, even if a large amount of the liquid water is supplied to the hydrogen compression stack 22, it is possible for the water content of the electrolyte membrane 27 to be made appropriate.

(Exemplary Modification 5)

In the first embodiment, the second embodiment, or the third embodiment, the operation stop control unit 102 need not necessarily cause the discharging of the fluid from the discharge port PT2 (the anode side of each of the unit cells 26) of the hydrogen compression stake 22 to be stopped prior to the water content adjustment process. In this case, if the water supply period is set to be longer in comparison with a case in which the discharging of the fluid from the discharge port PT2 of the hydrogen compression stack 22 is caused to stop, the liquid water can be sufficiently contained in the electrolyte membrane 27. In the present exemplary modification, during the water content adjustment process, or alternatively, after the water content adjustment process, the operation stop control unit 102 causes the discharging of the fluid from the discharge port PT2 of the hydrogen compression stack 22 to be stopped.

(Exemplary Modification 6)

In the first embodiment, the second embodiment, or the third embodiment, the operation stop control unit 102, upon receiving the operation stop command during execution of the compression operation, may execute the water content adjustment process while gradually causing the electrical current supplied to the hydrogen compression stack 22 to decrease.

(Exemplary Modification 7)

Figure 8:
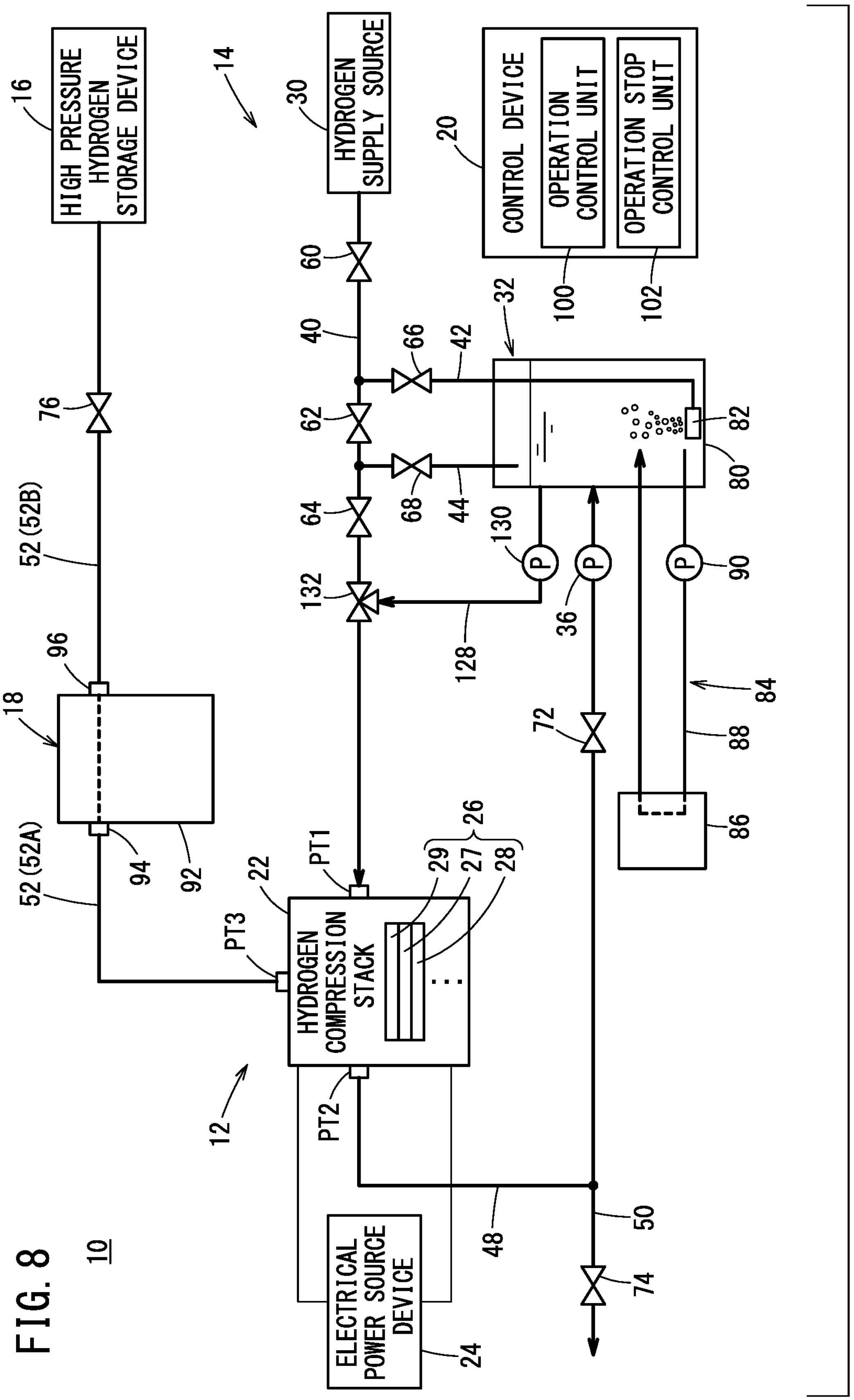
FIG. 8 is a schematic diagram showing an electrochemical hydrogen compression system according to an Exemplary Modification 7.

FIG. 8 is a schematic diagram showing an electrochemical hydrogen compression system 10 according to an Exemplary Modification 7. In FIG. 8, the same constituent elements as those described in the first embodiment are designated by the same reference numerals. Moreover, it should be noted that in the present embodiment, explanations that overlap or are redundant with those in the first embodiment will be omitted.

In the present exemplary modification, the water source 34, the water supply pathway 46, and the water supply valve 70 are not provided. On the other hand, in the present exemplary modification, a water supply pathway 128, a pump 130, and a pathway switching device 132 are newly provided. The water supply pathway 128, the pump 130, and the pathway switching device 132 are included in the supply device 14. Further, in the present exemplary modification, the sealed container 80 of the humidifier 32 is used as the water source 34.

The water supply pathway 128 is a pathway that guides the liquid water from the humidifier 32 to the supply pathway 40. An upstream end of the water supply pathway 128 is connected to the sealed container 80. A downstream end of the water supply pathway 128 is connected to the pathway switching device 132.

The pump 130 is a device that supplies the liquid water stored in the sealed container 80 to the hydrogen compression stack 22. The pump 130 is provided in the water supply pathway 128. The pump 130 is driven under the control of the control device 20. When the pump 130 is driven, a flowing force is applied to the hydrogen gas from the upstream side to the downstream side.

The pathway switching device 132 is a device that connects or disconnects the water supply pathway 128 to the supply pathway 40. The pathway switching device 132 switches the connection under the control of the control device 20. The pathway switching device 132, for example, is a three-way valve. The pathway switching device 132 is disposed in the supply pathway 40 at a location more downstream than a location to which a downstream end of the outlet pathway 44 is connected.

In the present exemplary modification, during execution of the compression operation, the operation control unit 100 controls the pathway switching device 132, and thereby does not allow the water supply pathway 128 to be connected to the supply pathway 40. In this case, the hydrogen gas is supplied from the hydrogen supply source 30 to the hydrogen compression stack 22.

On the other hand, together with driving the pump 130, the operation stop control unit 102 causes the water supply pathway 128 to be connected to the supply pathway 40, from the water content adjustment process being started (closing of the hydrogen supply valve 62) until the predetermined water supply period elapses. When the water supply period has elapsed, the operation stop control unit 102 causes the driving of the pump 130 to stop, and without allowing the water supply pathway 128 to be connected to the supply pathway 40, opens the hydrogen supply valve 62. In accordance therewith, the same advantageous effects as those of the first embodiment can be obtained.

Moreover, it should be noted that the water supply pathway 128, the pump 130, and the pathway switching device 132 may also be applied to the second embodiment or the third embodiment. For example, in the case that the water level of the water tank unit 92 at the time when the water content adjustment process is started is less than a predetermined water level threshold value, together with driving the pump 130, the operation stop control unit 102 causes the water supply pathway 128 to be connected to the supply pathway 40. In accordance with this feature, even if a small amount of the liquid water is stored in the water tank unit 92, the liquid water can be replenished from the sealed container 80, and as a result, an appropriate amount of the liquid water can be supplied to the hydrogen compression stack 22.

(Exemplary Modification 8)

Figure 9:
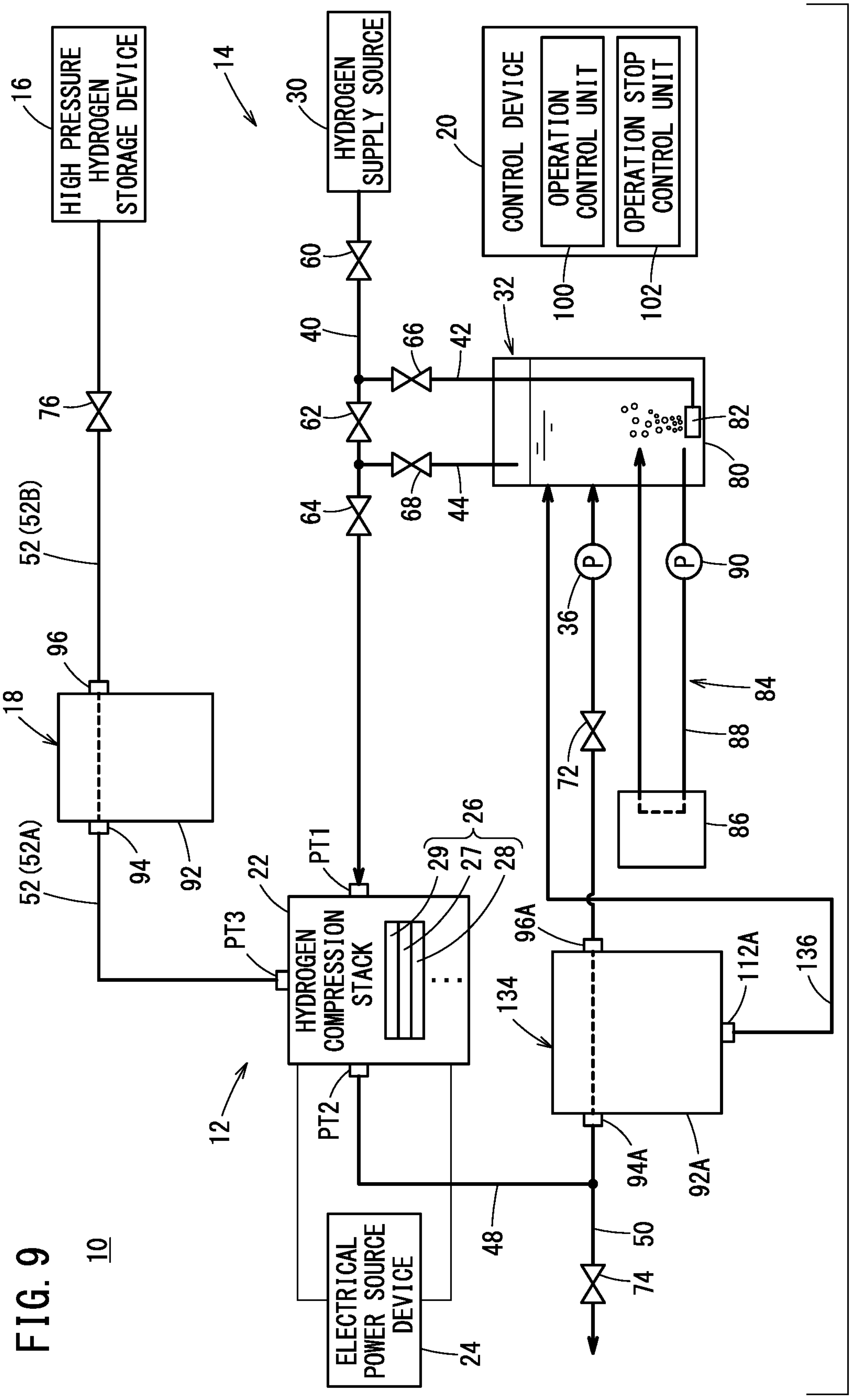
FIG. 9 is a schematic diagram showing an electrochemical hydrogen compression system according to an Exemplary Modification 8.

FIG. 9 is a schematic diagram showing an electrochemical hydrogen compression system 10 according to an Exemplary Modification 8. In FIG. 9, the same constituent elements as those described in the first embodiment are designated by the same reference numerals. Moreover, it should be noted that in the present embodiment, explanations that overlap or are redundant with those in the first embodiment will be omitted.

In the present exemplary modification, a second gas-liquid separation device 134 and a drainage pathway 136 are newly provided.

The second gas-liquid separation device 134 is disposed in the non-reacted gas pathway 48. The second gas-liquid separation device 134 includes a water tank unit 92A. A gas input member 94A, a gas outlet member 96A, and a water outlet member 112A are formed in the water tank unit 92A. The second gas-liquid separation device 134 separates the water from within the non-reacted hydrogen gas that is discharged from the hydrogen compression stack 22, and stores the water in the water tank unit 92A. The drainage pathway 136 is a pathway that guides the liquid water from the second gas-liquid separation device 134 to the humidifier 32. An upstream end of the drainage pathway 136 is connected to the water outlet member 112A. A downstream end of the drainage pathway 136 is connected to the sealed container 80.

In the present exemplary modification, the water from within the non-reacted hydrogen gas that is discharged from the hydrogen compression stack 22 can be used as a humidification source, and as a result, the liquid water can be used efficiently.

(Exemplary Modification 9)

The bubble generator 82, the inlet pathway 42, and the inlet valve 66 may be excluded from the electrochemical hydrogen compression system 10. Even without providing the bubble generator 82, the inlet pathway 42, and the inlet valve 66, the hydrogen gas flowing through the supply pathway 40 can still be humidified. Accordingly, even without providing the bubble generator 82, the inlet pathway 42, and the inlet valve 66, the same advantageous effects as those of the above-described embodiments can be obtained.

Hereinafter, a description will be given concerning the invention and the advantageous effects that are capable of being grasped from the description provided above.

(1) The present invention is characterized by the electrochemical hydrogen compression system (10), including the hydrogen compression stack (22) equipped with the unit cell (26) including the electrolyte membrane (27), the anode (28), and the cathode (29), the supply device (14) configured to supply the hydrogen gas and the liquid water to the hydrogen compression stack, the electrical power source device (24) configured to supply the electrical current to the hydrogen compression stack, and the control device (20) configured to control the supply device and the electrical power source device. The control device is equipped with the operation control unit (100) configured to cause the hydrogen gas to be supplied to the hydrogen compression stack, together with causing an electrical current to be supplied to the hydrogen compression stack from the electrical power source device, and to cause the compression operation to be executed by the hydrogen compression stack, and the operation stop control unit (102) which, upon receiving the operation stop command during execution of the compression operation, causes the liquid water to be supplied to the hydrogen compression stack, and thereafter causes the hydrogen gas to be supplied to the hydrogen compression stack.

Accordingly, after the electrolyte membrane of each of the unit cells in the hydrogen compression stack has been uniformly impregnated with water, the water content of the electrolyte membrane can be appropriately adjusted by being supplied with the hydrogen gas. In accordance therewith, the distribution of the water contained within the electrolyte membrane can be made substantially uniform in a short time period. As a result, the hydrogen compression stack can be started at an early stage.

(2) The present invention is characterized by the electrochemical hydrogen compression system according to the above-described item (1), the supply device including the hydrogen supply valve (62) disposed in the supply pathway (40) configured to guide the hydrogen gas from the hydrogen supply source (30) to the hydrogen compression stack, and the water supply valve (70) disposed in the water supply pathway (46) configured to guide the liquid water from the water source (34) to the supply pathway, wherein the control device may open the water supply valve until the predetermined water supply period has elapsed from the operation stop command, and may open the hydrogen supply valve when the predetermined gas supply period has elapsed from when the supply of the liquid water is stopped.

In accordance with such features, the liquid water and the hydrogen gas can be supplied via the supply pathway that is used during the compression operation. Accordingly, without changing the configuration of the hydrogen compression stack, after the electrolyte membrane of each of the unit cells in the hydrogen compression stack has been uniformly impregnated with water, the water content of the electrolyte membrane can be appropriately adjusted by being supplied with the hydrogen gas.

(3) The present invention is characterized by the electrochemical hydrogen compression system according to the above-described item (1), the supply device including the gas-liquid separation device (18) disposed in the discharge pathway (52) configured to guide the high pressure hydrogen gas discharged from the hydrogen compression stack, and to separate the water from within the high pressure hydrogen gas, the hydrogen supply valve disposed in the supply pathway configured to guide the hydrogen gas from the hydrogen supply source to the hydrogen compression stack, the water return valve (108) disposed in the water return pathway (104) configured to guide the liquid water from the gas-liquid separation device to the supply pathway, and the hydrogen return valve (110) disposed in the hydrogen return pathway (106) configured to guide the high pressure hydrogen gas from the gas-liquid separation device to the supply pathway, wherein the control device may open the water return valve until a predetermined water supply period has elapsed from when the hydrogen supply valve is closed, may open the hydrogen return valve after the supply of the liquid water is stopped, and may close the hydrogen return valve when the predetermined gas supply period has elapsed.

In accordance with such features, the liquid water and the hydrogen gas can be supplied to the hydrogen compression stack via the supply pathway that is used during the compression operation. Accordingly, without changing the configuration of the hydrogen compression stack, after the electrolyte membrane of each of the unit cells in the hydrogen compression stack has been uniformly impregnated with water, the water content of the electrolyte membrane can be appropriately adjusted by being supplied with the hydrogen gas.

Further, the water separated from within the high pressure hydrogen gas obtained during the compression operation can be supplied to the hydrogen compression stack. Accordingly, the electrochemical hydrogen compression system need not necessarily be provided with a water source. As a result, while suppressing an increase in the number of parts in the electrochemical hydrogen compression system, the distribution of the water contained in the electrolyte membrane can be made substantially uniform in a short time period. In addition thereto, the liquid water can be used efficiently.

Furthermore, the hydrogen gas in a dry state from which water has been separated by the gas-liquid separation device is capable of being supplied to the hydrogen compression stack. Accordingly, the water content of the electrolyte membrane can be rapidly adjusted, while in addition, the hydrogen gas can be used efficiently.

Furthermore, the liquid water is pushed out from the gas-liquid separation device by the high pressure hydrogen gas, and is supplied to the hydrogen compression stack. On the other hand, due to the pressure difference in the gas pressure between the discharge pathway and the supply pathway, the hydrogen gas is supplied from the gas-liquid separation device to the hydrogen compression stack. Therefore, there is no particular need to install a pump. Accordingly, while suppressing an increase in the number of parts in the electrochemical hydrogen compression system, the distribution of the water contained in the electrolyte membrane can be made substantially uniform in a short time period.

(4) The present invention is characterized by the electrochemical hydrogen compression system according to the above-described item (1), the supply device may include the gas-liquid separation device disposed in the discharge pathway configured to guide the high pressure hydrogen gas discharged from the hydrogen compression stack, and to separate the water from within the high pressure hydrogen gas, the hydrogen supply valve disposed in the supply pathway configured to guide the hydrogen gas from a hydrogen supply source to the hydrogen compression stack, and the return valve (118) disposed in the return pathway (116) configured to guide the liquid water and the high pressure hydrogen gas from the gas-liquid separation device to the supply pathway, wherein the control device may close the hydrogen supply valve and thereafter opens the return valve, and may cause the liquid water and the high pressure hydrogen gas to be discharged in this order from the gas-liquid separation device to the return pathway.

In accordance with such features, the liquid water and the hydrogen gas can be supplied to the hydrogen compression stack via the supply pathway that is used during the compression operation. Accordingly, without changing the configuration of the hydrogen compression stack, after the electrolyte membrane of each of the unit cells in the hydrogen compression stack has been uniformly impregnated with water, the water content of the electrolyte membrane can be appropriately adjusted by being supplied with the hydrogen gas.

Further, the water separated from within the high pressure hydrogen gas obtained during the compression operation can be supplied to the hydrogen compression stack. Accordingly, the electrochemical hydrogen compression system need not necessarily be provided with a water source. As a result, while suppressing an increase in the number of parts in the electrochemical hydrogen compression system, the distribution of the water contained in the electrolyte membrane can be made substantially uniform in a short time period. In addition thereto, the liquid water can be used efficiently.

Furthermore, the hydrogen gas in a dry state from which water has been separated by the gas-liquid separation device is capable of being supplied to the hydrogen compression stack. Accordingly, the water content of the electrolyte membrane can be rapidly adjusted, while in addition, the hydrogen gas can be used efficiently.

Furthermore, the liquid water is pushed out from the gas-liquid separation device by the high pressure hydrogen gas, and is supplied to the hydrogen compression stack. On the other hand, due to the pressure difference in the gas pressure between the discharge pathway and the supply pathway, the hydrogen gas is supplied from the gas-liquid separation device to the hydrogen compression stack. Therefore, there is no particular need to install a pump. Accordingly, while suppressing an increase in the number of parts in the electrochemical hydrogen compression system, the distribution of the water contained in the electrolyte membrane can be made substantially uniform in a short time period.

Furthermore, merely by opening the return valve, the liquid water and the hydrogen gas can be supplied to the hydrogen compression stack. Accordingly, the processing load on the control device can be reduced.

(5) The present invention is characterized by the electrochemical hydrogen compression system according to the above described item (4), wherein the control device may calculate an amount of the water discharged from the gas-liquid separation device based on the water level of the liquid water stored in the gas-liquid separation device, and in accordance with the calculated amount of water, may change the timing at which the return valve is closed.

In accordance with such features, the gas supply period during which the gas is supplied can be automatically set in accordance with the supplied amount of the liquid water.

(6) The present invention is characterized by the electrochemical hydrogen compression system according to the above-described item (4), wherein, when the pressure of the high pressure hydrogen gas in the discharge pathway becomes less than or equal to the predetermined pressure threshold value, the control device may close the return valve.

In accordance with such features, an appropriate amount of the hydrogen gas can be supplied to the hydrogen compression stack.

(7) The present invention is characterized by the electrochemical hydrogen compression system according to the above-described item (4), wherein the gas-liquid separation device may further include the water tank unit (92) in which the water is stored, and the pipe member (124) configured to project out from the bottom wall of the water tank unit into the internal space of the water tank unit, and including a distal end communicating with the internal space and a proximal end communicating with the return pathway.

In accordance with such features, the gas pressure in the water tank unit at the point in time when the liquid water has finished flowing out is capable of being adjusted by the length of the pipe member. Therefore, it is possible to avoid a difference in the gas pressure between the discharge pathway and the supply pathway from disappearing at a timing when the liquid water has finished flowing out. Accordingly, due to the difference in the gas pressure, the hydrogen gas can be reliably supplied from the gas-liquid separation device to the supply pathway.

(8) The present invention is characterized by the electrochemical hydrogen compression system according to the above-described item (7), wherein the pipe member may be formed to be capable of expanding and contracting, the gas-liquid separation device may further include the pipe driving unit (126) configured to cause the pipe member to expand or contract, and the control device may control the pipe driving unit, and may thereby adjust the length of the pipe member.

In accordance with such features, the gas pressure in the water tank unit at the point in time when the liquid water has finished flowing out can be automatically set in accordance with the water level in the water tank unit or the like.

(9) The present invention is characterized by the electrochemical hydrogen compression system according to any one of the above-described items (1) to (4), wherein the control device may cause the liquid water to be supplied to the hydrogen compression stack, after having stopped the supply of the electrical current to the hydrogen compression stack, or alternatively, while causing the electrical current supplied to the hydrogen compression stack to decrease.

In accordance with such features, it is possible to reduce the oxygen gas generated by electrolysis of the water remaining in the unit cells. Accordingly, it is possible to decrease the concentration of the oxygen gas that is mixed with the hydrogen gas supplied to the hydrogen compression stack. As a result, the occurrence of a chemical reaction between the oxygen gas and the hydrogen gas can be suppressed.

(10) The present invention is characterized by the electrochemical hydrogen compression system according to the above-described item (1), and may further include the humidifier (32) configured to humidify the hydrogen gas flowing through the supply pathway configured to guide the hydrogen gas from the hydrogen supply source to the hydrogen compression stack, the second gas-liquid separation device (134) disposed in the non-reacted gas pathway (48) configured to guide the non-reacted hydrogen gas discharged from the hydrogen compression stack, to separate the water from within the non-reacted hydrogen gas, and the drainage pathway (136) configured to guide the water separated by the second gas-liquid separation device to the humidifier.

In accordance with such features, the liquid water can be used efficiently.

It should be noted that the present invention is not limited to the disclosure described above, and various additional or alternative configurations could be adopted therein without departing from the essence and gist of the present invention.

The invention claimed is:

1. An electrochemical hydrogen compression system comprising:
- a hydrogen compression stack comprising a unit cell including an electrolyte membrane, an anode, and a cathode;
- a supply device configured to supply hydrogen gas and liquid water to the hydrogen compression stack;
- an electrical power source device configured to supply an electrical current to the hydrogen compression stack; and
- a control device configured to control the supply device and the electrical power source device;
- wherein the control device comprises one or more processors configured to execute computer executable instructions that are stored in a memory,
- by the computer executable instructions being executed by the one or more processors, the control device causes the hydrogen gas to be supplied to the hydrogen compression stack, together with causing the electrical current to be supplied to the hydrogen compression stack from the electrical power source device, and causes a compression operation to be executed by the hydrogen compression stack, and
- when the control device receives an operation stop command during execution of the compression operation, the control device causes the liquid water to be supplied to the hydrogen compression stack, and thereafter causes the hydrogen gas to be supplied to the hydrogen compression stack.

2. The electrochemical hydrogen compression system according to claim 1, the supply device comprising:
- a hydrogen supply valve disposed in a supply pathway configured to guide the hydrogen gas from a hydrogen supply source to the hydrogen compression stack; and
- a water supply valve disposed in a water supply pathway configured to guide the liquid water from a water source to the supply pathway;
- wherein the control device opens the water supply valve until a predetermined water supply period has elapsed from the operation stop command, and closes the hydrogen supply valve when a predetermined gas supply period has elapsed from when supply of the liquid water is stopped.

3. The electrochemical hydrogen compression system according to claim 1, the supply device comprising:
- a gas-liquid separation device disposed in a discharge pathway configured to guide a high pressure hydrogen gas discharged from the hydrogen compression stack, and to separate water from within the high pressure hydrogen gas;
- a hydrogen supply valve disposed in a supply pathway configured to guide the hydrogen gas from a hydrogen supply source to the hydrogen compression stack;
- a water return valve disposed in a water return pathway configured to guide the liquid water from the gas-liquid separation device to the supply pathway; and
- a hydrogen return valve disposed in a hydrogen return pathway configured to guide the high pressure hydrogen gas from the gas-liquid separation device to the supply pathway;
- wherein the control device opens the water return valve until a predetermined water supply period has elapsed from when the hydrogen supply valve is closed, opens the hydrogen return valve after supply of the liquid water is stopped, and closes the hydrogen return valve when a predetermined gas supply period has elapsed.

4. The electrochemical hydrogen compression system according to claim 1, the supply device comprising:
- a gas-liquid separation device disposed in a discharge pathway configured to guide a high pressure hydrogen gas discharged from the hydrogen compression stack, and to separate water from within the high pressure hydrogen gas;
- a hydrogen supply valve disposed in a supply pathway configured to guide the hydrogen gas from a hydrogen supply source to the hydrogen compression stack; and
- a return valve disposed in a return pathway configured to guide the liquid water and the high pressure hydrogen gas from the gas-liquid separation device to the supply pathway;
- wherein the control device closes the hydrogen supply valve and thereafter opens the return valve, and causes the liquid water and the high pressure hydrogen gas to be discharged in this order from the gas-liquid separation device to the return pathway.

5. The electrochemical hydrogen compression system according to claim 4, wherein the control device calculates an amount of water discharged from the gas-liquid separation device based on a water level of the liquid water stored in the gas-liquid separation device, and in accordance with the calculated amount of water, changes a timing at which the return valve is closed.

6. The electrochemical hydrogen compression system according to claim 4, wherein, when a pressure of the high pressure hydrogen gas in the discharge pathway becomes less than or equal to a predetermined pressure threshold value, the control device closes the return valve.

7. The electrochemical hydrogen compression system according to claim 4, wherein the gas-liquid separation device further comprises:

a water tank unit in which the water is stored;

a pipe member configured to project out from a bottom wall of the water tank unit into an internal space of the water tank unit, and including a distal end communicating with the internal space and a proximal end communicating with the return pathway.

8. The electrochemical hydrogen compression system according to claim 7, wherein:

the pipe member is formed to be capable of expanding and contracting;

the gas-liquid separation device further comprises a pipe driving unit configured to cause the pipe member to expand or contract; and the control device controls the pipe driving unit, and thereby adjusts a length of the pipe member.

9. The electrochemical hydrogen compression system according to claim 1, wherein the control device causes the liquid water to be supplied to the hydrogen compression stack, after having stopped supply of the electrical current to the hydrogen compression stack, or alternatively, while causing the electrical current supplied to the hydrogen compression stack to decrease.

10. The electrochemical hydrogen compression system according to claim 1, further comprising:

a humidifier configured to humidify the hydrogen gas flowing through a supply pathway configured to guide the hydrogen gas from a hydrogen supply source to the hydrogen compression stack;

a second gas-liquid separation device disposed in a non-reacted gas pathway configured to guide a non-reacted hydrogen gas discharged from the hydrogen compression stack, to separate water from within the non-reacted hydrogen gas; and a drainage pathway configured to guide the water separated by the second gas-liquid separation device to the humidifier.

* * * * *